United States Patent [19]

Graiff et al.

[11] Patent Number: 5,334,308

[45] Date of Patent: * Aug. 2, 1994

[54] REDUCTION OF JET ENGINE SMOKE EMISSIONS BY CONTACTING JET FUEL WITH A CARBON MOLECULAR SIEVE ADSORBENT

[75] Inventors: Leonard B. Graiff; Danny Y. Ngan, both of Houston; Benton E. Visser, Cypress; Greg E. Webster, Houston, all of Tex.

[73] Assignee: Shell Oil Company, Houston, Tex.

[*] Notice: The portion of the term of this patent subsequent to Apr. 5, 2011 has been disclaimed.

[21] Appl. No.: 902,601

[22] Filed: Jun. 23, 1992

[51] Int. Cl.$^5$ .............................................. C10G 25/00
[52] U.S. Cl. ................................ 208/299; 208/310 R; 208/15; 585/820
[58] Field of Search ............... 208/299, 310 R, 310 Z, 208/15; 585/820

[56] References Cited

U.S. PATENT DOCUMENTS

| | | | |
|---|---|---|---|
| 2,395,491 | 2/1946 | Mavity | 585/828 |
| 2,716,144 | 8/1955 | Olsen | 208/310 R |
| 2,916,446 | 12/1959 | Shuman | 208/310 R |
| 3,070,639 | 12/1962 | Geerts et al. | 585/831 |
| 3,278,422 | 10/1966 | Epperly et al. | 208/310 R |
| 3,340,316 | 9/1967 | Wackher et al. | 208/310 R |
| 3,409,691 | 11/1968 | Small | 585/824 |
| 3,698,157 | 10/1972 | Allen et al. | 55/67 |
| 4,290,881 | 9/1981 | Dielacher et al. | 208/310 R |
| 4,337,156 | 6/1982 | de Rosset | 210/672 |
| 4,447,315 | 5/1984 | Lamb et al. | 208/99 |
| 4,608,153 | 8/1986 | Hudson et al. | 208/112 |
| 4,618,412 | 10/1986 | Hudson et al. | 208/59 |
| 4,624,776 | 11/1986 | Long et al. | 208/302 |
| 4,698,146 | 10/1987 | Gruia | 208/86 |
| 4,775,460 | 10/1988 | Reno | 208/91 |
| 4,804,457 | 2/1989 | Ngan | 208/64 |

Primary Examiner—R. Bruce Breneman
Assistant Examiner—Walter D. Griffin
Attorney, Agent, or Firm—Timothy J. Hadlock

[57] ABSTRACT

The present invention is a process for reducing the smoke emissions from a jet fuel engine by combusting a jet fuel range hydrocarbon in a jet engine wherein prior to combusting the jet fuel in the engine the jet fuel is treated by the following process: (a) contacting the jet fuel with at least one adsorbent in at least one adsorbent bed under suitable process conditions such that the smoke point of the jet fuel is increased and (b) recovering the jet fuel.

2 Claims, No Drawings

REDUCTION OF JET ENGINE SMOKE EMISSIONS BY CONTACTING JET FUEL WITH A CARBON MOLECULAR SIEVE ADSORBENT

FIELD OF THE INVENTION

This invention relates to a process for reducing jet engine smoke emissions by contacting a jet fuel with one or more adsorbents prior to combusting the jet fuel in the engine.

BACKGROUND OF THE INVENTION

Smoke emissions in jet engines are caused in part by particulates resulting from uncombusted portions of the jet fuel which result in part from impurities in the jet fuel. Combustor deposits in the jet engine are also a problem resulting from impurities in the fuel. In previous practice smoke emissions from jet engines were reduced by engine designing to maximize engine efficiency in combusting a high percentage of the jet fuel. Accordingly, it would be desirable to have jet fuel compositions and methods of making such compositions which lack the undesirable impurities and have reduced tendencies to cause smoke emissions.

SUMMARY OF THE INVENTION

It has now been discovered that a particular process for removing impurities from jet fuel reduces a jet fuel's smoke emissions tendencies. The present invention relates to a process for reducing the smoke emissions from a jet fuel engine resulting from combusting a jet fuel range hydrocarbon in a jet engine where, prior to combusting the jet fuel, in the engine the jet fuel is treated by the following process: (a) contacting the jet fuel with at least one adsorbent in at least one adsorbent bed under suitable process conditions such that the smoke point of the jet fuel is increased and (b) recovering the jet fuel.

DETAILED DESCRIPTION OF THE INVENTION

One aspect of the present invention is an improved method for reducing particulate emissions, e.g., smoke emissions, in a jet fuel engine by the following steps: (1) feeding the jet fuel to at least one adsorbent bed; (2) contacting the jet fuel with at least one adsorbent under suitable process conditions such that the smoke point is increased an effective amount to reduce smoke emissions; and (3) recovering the treated jet fuel having increased smoke point. While not limiting the invention to theories of mechanism, it is theorized the contacting results in removal of impurities which cause smoke emissions.

As used in this description and in the appended claims, the term "jet fuel" means one refinery unit's product stream or a combination of two or more refinery units' product streams of at least one hydrocarbon in the jet fuel boiling range from about 300° F. to about 572° F. The temperature of contacting jet fuel and adsorbent is between about 30° F. and about 800° F., preferably between about 50° F. and about 200° F. The pressure is ambient pressure or is adjusted to be compatible with the relevant refinery process units. The jet fuel is contacted with the adsorbent at a liquid hourly space velocity between about 0.5 and 30. The mean residence time is between about 2 and 120 minutes.

One or more adsorbents are used, either individually or together in one or more beds, in practicing the instant invention. Where multiple adsorbents are used they are in series in the same or separate beds. Multiple adsorbents are mixed either randomly or in a planned manner in one or more beds. The adsorbents are matched to the type of whole jet fuel or jet fuel stream treated.

Suitable adsorbents are carbonaceous and/or polarsite containing adsorbents. These include, for example, acid activated carbon, activated carbon, alumina containing basic metal oxides, carbon molecular sieves, sodium exchanged acid active carbon, polymeric adsorbents such as Rohm & Haas XAD-7, strong acid ion exchange resins such as DOWEX MSC-1, a high-surface area alumina such as type F1 from Alcoa or type 400 from Criterion, large pore zeolites (pore size greater than 4.8A°), especially ultrastable Y (USY), including $H^+$, $NH_4^+$, rare earth, and SC USY, very ultrastable Y (VUSY), clays, especially acid clays and ammonium clays, zirconia and acid modified oxides, hydrated niobium oxide, silica-alumina and silica, especially if modified to make it organophilic.

Other suitable adsorbents are calcium oxide; calcined calcium oxide; sodalime; sodalime supported on alumina; magnesia; magnesia modified with alkali metal hydroxides; potassium carbonate; slaked lime (calcium hydroxide); slaked lime modified with alkali metal hydroxides; calcined alumina; alkali metal impregnated alumina; alkali metal hydroxide impregnated alumina; alkaline earth metal hydroxide impregnated alumina; alumina impregnated with alkaline earth nitrates subsequently precipitated with excess alkali metal hydroxides; alumina impregnated with potassium carbonate and calcined to decompose the carbonate; basic minerals such as hydrotalcite and cacoxenite; base treated clays such as calcium montmorillonite, wollastonite, bentonite; and base treated oxides such as zirconia, alumina, titania, iron oxide, and the like.

Particularly suitable are active carbon, acid active carbon, carbon molecular sieves (CMS) with or without binders, zeolite USY, strong acid ion exchange resins, e.g., DOWEX MSC-1, AMBERLYST 15, and AMBERLYST XN-1010, and alumina, and supported bases having a moderate to high surface area (50 or more $m^2/g$) prepared by precipitation of alkaline earth oxides with alkali metal hydroxides or by decomposition of alkali metal carbonates. Seven to 10 percent weight water in USY-$H^+$ provides good results. Acid activated carbon (AAC) is optionally prepared as described in U.S. Pat. No. 4,547,619, which disclosure is hereby incorporated by reference. Carbon molecular sieves are described by T. M. O'Grady and A. N. Wennerberg in *High Surface Area Active Carbon. Petroleum-Derived Carbons* 302 (ACS Symposium Series 303, American Chemical Society, Washington, D.C. 1986) and are available from Anderson Development Company.

At a point in time prior to saturation, the jet fuel feed should be switched to a fresh adsorbent bed and the nearly saturated bed should be regenerated. A regeneration step is optionally included in all of the embodiments of this invention. The regeneration can be achieved by contacting the spent adsorbent with a regenerant stream under conditions which cause the adsorbed compounds to be sufficiently desorbed to restore the adsorptive capacity of the adsorbent and then purging the adsorbent to remove the regenerant. Such regeneration is well known.

The present invention also includes a jet fuel composition having a reduced tendency to cause smoke emissions whenever prepared by the above-described methods and equivalents thereof.

The ranges and limitations provided in the instant specification and claims are those which are believed to most particularly point out and distinctly claim the instant invention. It is, however, understood that other ranges and limitations that perform substantially the same function in substantially the same way to obtain substantially the same result are intended to be within the scope of the instant invention as defined by the instant specification and claims.

EXAMPLES

The invention will be described by the following examples which are provided for illustrative purposes and are not to be construed as limiting the invention:

Example 1: Preparation of Jet Fuel

A jet fuel in a quantity of 1800 to 2000 gallons is treated by contact with an activated carbon. The apparatus to be used for the experiment is a 55-gallon polypropylene drum in which the activated carbon is received from the manufacturer, Calgon. The activated carbon used is designated by Calgon as "CAL Activated Carbon."

No special packing or loading of the adsorbent is done. The adsorbent is used as packed in the drum as received from the manufacturer. The weight of the adsorbent is 165 pounds. The untreated jet fuel is fed through the adsorbent bed at a flow rate of 3 gallons per minute. The average residence time of the jet fuel in the bed is 15 minutes. The temperature of the bed is at about ambient temperature which is about 80° F. The pressure is also at or near atmospheric pressure. The drum is sealed and has a 5 psig capacity. After exiting the feed conduit and passing through the adsorbent bed the treated jet fuel is removed from the bed by an overflow removal conduit which feeds into a storage tank for the treated jet fuel.

Example 2: Smoke Point Increase

In this example, both untreated jet fuel and jet fuel treated according to Example 1 above are tested for smoke point. The smoke point is then determined using the standardized method ASTM D 1322. In summary, in this method a sample is burned in an enclosed wick-fed lamp that is calibrated daily against pure hydrocarbon blends of known smoke point. The maximum height of flame that can be achieved with the test fuel without smoking is estimated to the nearest millimeter. The results of the treated and untreated jet fuel are compared. The results will show that the treatment will result in a jet fuel having an increased smoke point and thus having an improvement in a key performance characteristic of jet fuel.

What is claimed is:

1. A process for reducing the smoke emissions from a jet fuel engine comprising combusting a jet fuel range hydrocarbon in a jet engine wherein prior to combusting the jet fuel in the engine the jet fuel is treated by a process consisting essentially of:
   (a) contacting the jet fuel with a carbon molecular sieve adsorbent at a liquid hourly space velocity between about 0.5 and 30, ambient pressure, and at a temperature between about 30° F. and 800° F. in at least one adsorbent bed under suitable process conditions such that the smoke point of the jet fuel is increased; and
   (b) recovering the jet fuel.

2. The process according to claim 1 wherein the jet fuel is contacted with the adsorbent at a temperature between about 50° F. and 200° F.

* * * * *